United States Patent
Sasin et al.

(10) Patent No.: US 10,382,394 B2
(45) Date of Patent: Aug. 13, 2019

(54) ASSIGNMENT OF TENANCY TO DEVICES

(71) Applicant: ARM Limited, Cambridge (GB)

(72) Inventors: Szymon Sasin, Oulu (FI); Norbert David, Oulu (FI); Mikko Johannes Saarnivala, Oulu (FI)

(73) Assignee: ARM Limited, Cambridge (GB)

( * ) Notice: Subject to any disclaimer, the term of this patent is extended or adjusted under 35 U.S.C. 154(b) by 126 days.

(21) Appl. No.: 14/972,564

(22) Filed: Dec. 17, 2015

(65) Prior Publication Data
US 2016/0182447 A1  Jun. 23, 2016

(51) Int. Cl.
| | |
|---|---|
| *H04L 29/12* | (2006.01) |
| *H04W 4/70* | (2018.01) |
| *H04W 4/50* | (2018.01) |
| *G06F 9/4401* | (2018.01) |
| *H04L 12/911* | (2013.01) |
| *H04L 29/08* | (2006.01) |
| *H04L 29/06* | (2006.01) |
| *H04W 12/04* | (2009.01) |
| *H04W 12/06* | (2009.01) |

(52) U.S. Cl.
CPC ........ *H04L 61/3025* (2013.01); *G06F 9/4416* (2013.01); *H04L 47/781* (2013.01); *H04L 63/0823* (2013.01); *H04L 67/34* (2013.01); *H04W 4/50* (2018.02); *H04W 4/70* (2018.02); *H04W 12/04* (2013.01); *H04W 12/06* (2013.01); *H04L 61/6004* (2013.01)

(58) Field of Classification Search
CPC ............... G06F 9/4416; H04L 61/3025; H04L 61/6004; H04L 63/0823; H04L 63/0876; H04L 67/34; H04L 47/781; H04L 41/0806; H04W 4/001; H04W 4/005; H04W 12/04; H04W 12/064
See application file for complete search history.

(56) References Cited

U.S. PATENT DOCUMENTS

| | | | |
|---|---|---|---|
| 2009/0187970 A1* | 7/2009 | Mower ................ | H04L 67/025 726/3 |
| 2011/0072255 A1* | 3/2011 | Gopalakrishnan .... | G06F 9/4416 713/2 |
| 2012/0215918 A1* | 8/2012 | Vasters .................. | H04L 67/02 709/226 |

(Continued)

FOREIGN PATENT DOCUMENTS

| | | |
|---|---|---|
| GB | 2533385 A | 2/2016 |
| WO | WO2014190177 A1 | 11/2014 |
| WO | WO 2014190177 A1 * | 11/2014 ......... H04L 63/0876 |

OTHER PUBLICATIONS

Open Mobile Alliance: "Lightweight Machine to Machine Technical Specification—Candidate Version 1.0", Dec. 10, 2013 (Dec. 10, 2013), 104 pages.*

(Continued)

*Primary Examiner* — Michael C Lai
(74) *Attorney, Agent, or Firm* — Kinney & Lange, PA (57) ABSTRACT

A method of assigning tenancy to a device during bootstrapping between a device and a server in a network includes transmitting a device identifier to a bootstrap server. The method further includes receiving, at the device, a device server address to enable the device to register with the device server. The tenancy is assigned to the device with the device server address.

7 Claims, 10 Drawing Sheets

(56) References Cited

U.S. PATENT DOCUMENTS

| | | | |
|---|---|---|---|
| 2013/0198346 A1* | 8/2013 | Jubran | H04L 41/12 709/220 |
| 2014/0059519 A1* | 2/2014 | Bhogal | G06F 9/44505 717/121 |
| 2014/0059544 A1* | 2/2014 | Koganty | G06F 9/45533 718/1 |
| 2014/0215217 A1* | 7/2014 | Gronowski | H04L 9/0838 713/171 |
| 2015/0215376 A1* | 7/2015 | Kranz | H04L 67/10 709/226 |

OTHER PUBLICATIONS

Open Mobile Alliance, Lightweight Machine to Machine Technical Specification, Candidate Version 1.0, Dec. 10, 2013, 104 pages.
International Search Report and Written Opinion for PCT Application No. PCT/GB2015/054055, dated Mar. 14, 2016.
Great Britain Examination Report for Great Britain Patent Application No. GB1513750.8, dated Nov. 10, 2017, 3 pages.
The Great Britain Search Report dated Jun. 26, 2015 for Great Britain Application No. GB1422669.0.
International Preliminary Report on Patentability for PCT Application No. PCT/GB2015/054055, dated Jun. 20, 2017, 8 pages.

* cited by examiner

ASSIGNMENT OF TENANCY TO DEVICES

CROSS-REFERENCE TO RELATED APPLICATION(S)

This application claims priority to United Kingdom Patent Application Ser. No. 1422669.0 entitled "ASSIGNMENT OF TENANCY TO DEVICES," filed on Dec. 18, 2014, which is hereby incorporated by reference in its entirety.

BACKGROUND

Techniques of this disclosure relate, in general, to an assignment of tenancy to devices generally known as end nodes, endpoints or Internet of Things (IoT) devices.

The Internet of Things encompasses devices and networks that are IP-enabled and Internet-connected, along with the Internet services monitoring and controlling those devices. Such IP-enabled devices connected to the Internet may be termed end nodes, endpoints or IoT devices and include sensors, machines, active positioning tags, radio-frequency identification (RFID) readers and building automation equipment to name but a few.

Data exchange between programs, computers and Machine-to-Machine (M2M) is a vital element. Different programs, computers and processors are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination and above TCP/IP, the Hypertext Transfer Protocol (HTTP) is used as a client/server protocol whereby a program may send an HTTP request to a server which responds with another HTTP message.

The Wireless Embedded Internet is a subset of the Internet of Things and is generally represented by resource-limited embedded devices, often battery powered and connected by low-power, low-bandwidth wireless networks to the Internet.

Current web service technologies have high power and large bandwidth demands neither of which are compatible with low-power networks. Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

An example of a network technology where Machine-to-Machine (M2M) communication is widely applied is a low-power wireless network, such as an IEEE 802.15.4 based embedded and sensor network. More recently, as M2M devices have become IP enabled, systems have become more open by using IP as a networking protocol.

Following the introduction of IEEE 802.15.4 other standards were developed to standardize an IP adaption for such wireless embedded links. For example, the IPv6 over Low Power Wireless Standard (6LoWPAN) is a set of standards which enable the efficient use of IPv6 over low-power, low-rate wireless networks on simple embedded devices through an adaption layer and the optimization of related protocols.

The Open Mobile Alliance Lightweight LWM2M is a standard applicable to 6LoWPAN and is focused on constrained cellular and M2M devices. A Lightweight Machine-to-Machine (LWM2M) Bootstrap process is used to provide mandatory information through the Bootstrap Interface for LWM2M Clients so that they can perform the registration with one or more LWM2M Servers. During bootstrapping, a device (the tenant) may register with a cloud based server (a host), to access applications across a domain. A domain may be a logical grouping of devices and when the domain is exported to Domain Name System (DNS) then the domain value normally equates to the DNS domain name.

Tenancy may be classified as single tenancy or multiple tenancy. If a cloud based server provides a domain for a sole tenant or single entity, this is known as single tenancy. A cloud based server may provide the same or a similar applications to multiple entities or multiple tenants including those entities that are unrelated in the sense that the multiple entities own different devices or resources for different purposes. In such a case this is known as multiple tenancy and typically a cloud based server with multiple tenants will have multiple customers owning multiple devices.

Presently, a device is pre-configured before bootstrapping with its tenant name so that the device knows in advance which tenant name to use in registration with a device server. Such pre-configuration can be a costly overhead in both time and resource.

SUMMARY

In one example, a method of assigning tenancy to a device during bootstrapping between a device and a server in a network includes transmitting a device identifier to a bootstrap server. The method further includes receiving, at the device, a device server address to enable the device to register with a device server. The tenancy is assigned to the device with the device server address.

In another example, a method of assigning tenancy to a device during bootstrapping between a device and a server in a network includes receiving a device identifier at a bootstrap server; and transmitting, to the device, a device server address to enable the device to register with a device server. The method further includes assigning tenancy to the device with the device server address.

In another example, a method of assigning tenancy to a device during bootstrapping between a device and a server in a network includes transmitting a device identifier to a bootstrap server; and receiving, at the device, a device server address to enable the device to register with a device server. Upon registration of the device with the device server, the device server communicates with the bootstrap server to request assignment of tenancy for the device. The method further includes assigning tenancy to the device.

In another example, a method of assigning tenancy to a device during bootstrapping between a device and a server in a network includes receiving a device identifier at a bootstrap server; and transmitting, to the device, a device server address to enable the device to register with a device server. The method further includes receiving at the bootstrap server a request of tenancy for the device from the device server and thereby assigning tenancy to the device.

In another example, a method of assigning tenancy to a device during bootstrapping between a device and a server in a network includes transmitting a device identifier to a bootstrap server; and receiving, at the device, a device server address to enable the device to register with a device server.

The device server is provided with assignment of the tenancy for the device before registration of the device with the device server.

In another example, a method of assigning tenancy to a device during bootstrapping between a device and a server in a network includes receiving a device identifier at a bootstrap server; transmitting, to a device server, an assignment of tenancy for the device; and transmitting, to the device, a device server address to enable the device to register with a device server. The device server is provided with the assignment of tenancy for the device before registration of the device with the device server.

In another example, a method of assigning tenancy to a device during bootstrapping between a device and a server in a network includes receiving a device identifier at a bootstrap server; providing, from the bootstrap server, the device identifier to a device server; and providing, from the bootstrap server to the device, information to enable the device to register with the device server. The device server is provided with an assignment of tenancy for the device prior to registration of the device with the device server.

In another example, a method of assigning tenancy to a device during bootstrapping between a device and a server in a network includes receiving, from a bootstrap server, a device identifier; receiving, from a device, a request to register the device with a device server; and assigning tenancy based upon the device identifier.

DETAILED DESCRIPTION

Techniques of this disclosure provide additional features to the LWM2M Bootstrap process. The techniques enable single or multiple tenancy to be assigned to a device as part of a bootstrap process without the device being pre-configured with the tenant name.

Figure 1:
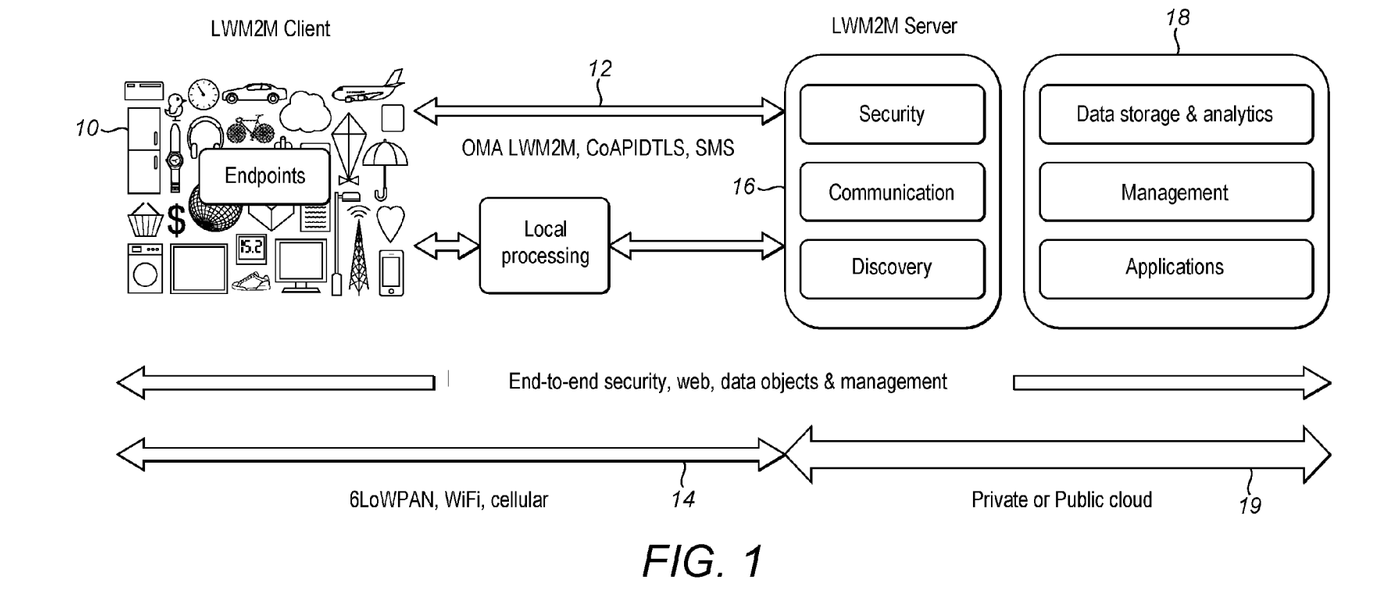
FIG. 1 is a schematic diagram of a LWM2M deployment scenario.

Embodiments will now be described, by way of example only, and with reference to the accompanying drawings. Therefore, referring to FIG. 1 a deployment scenario for an M2M endpoint device 10 is shown across a range of market segments from streetlights and electric meters to home and building automation. The endpoint devices 10 may interface 12 with a LWM2M server 16 based on open IETF standards such as Constrained Application Protocol (CoAP) over a low-power wireless network. One such low-power wireless network is an IEEE 802.15.4 based embedded and sensor network using IPv6 over Low Power Wireless Standard (6LoWPAN) 14. The LWM2M server 16 can interface with the wider world-wide web network 18 enabling deployment of M2M applications from a private server, private cloud or public cloud environment 19.

Figure 2:
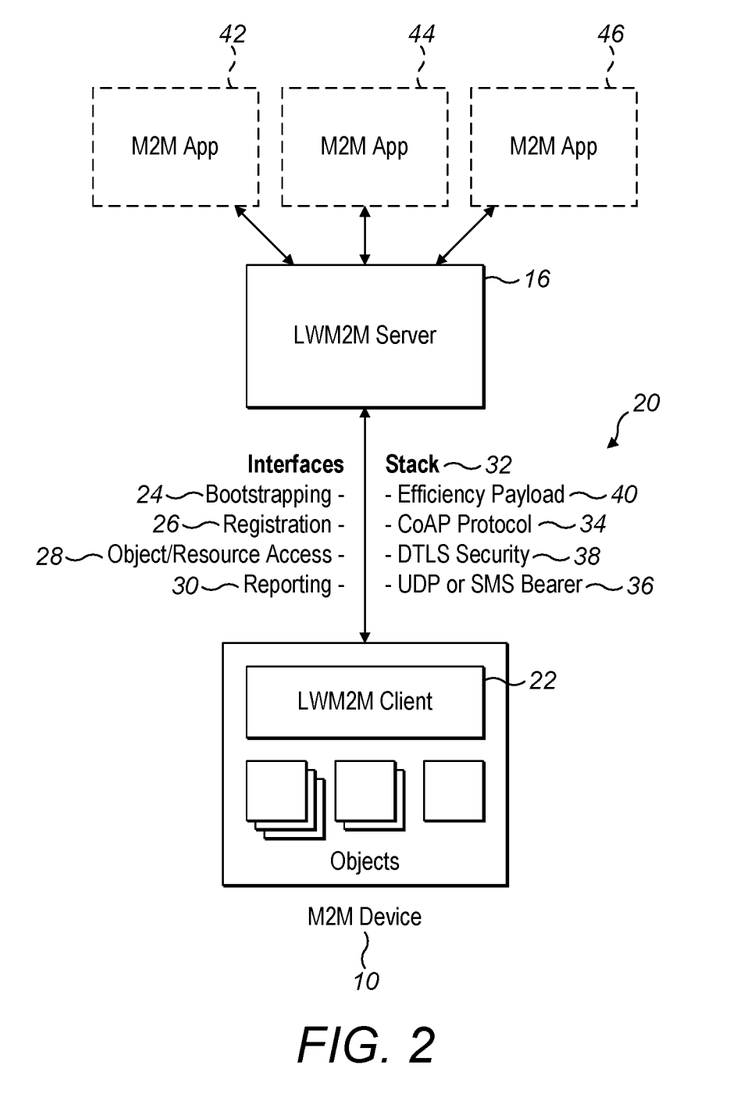
FIG. 2 is a schematic diagram of a LWM2M architecture with Server and Client.
Figure 3:
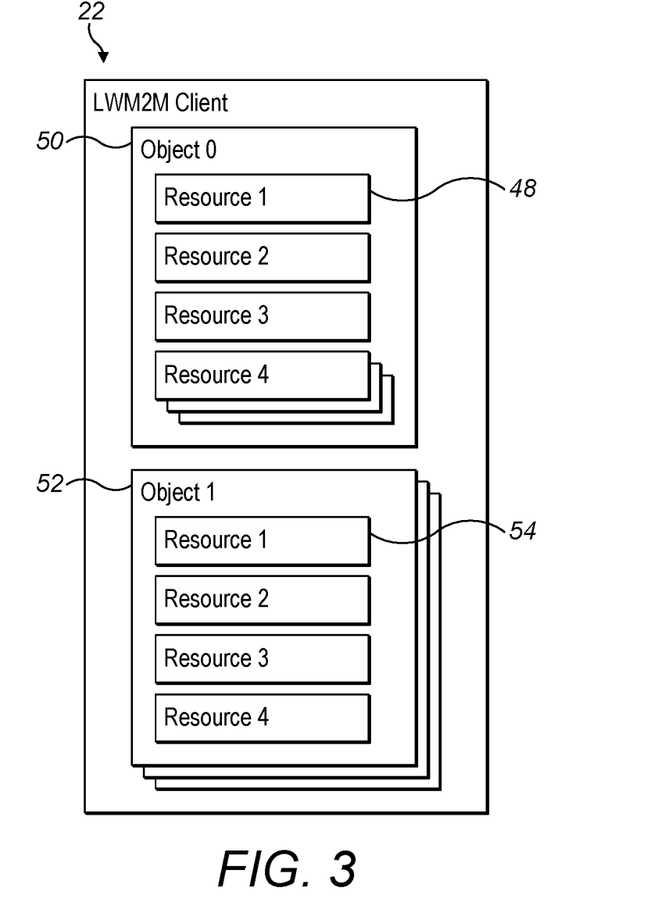
FIG. 3 is a schematic diagram of a LWM2M object model.

FIGS. 2 and 3 show the LWM2M architecture 20 which technically defines the application layer communication protocol for use between a client 22 on the M2M endpoint device 10 and server software on a LWM2M server 16. The client 22 resides on the device 10 and is integrated as a software library or a built-in function of a module or device 10. The server 16 is located in a private or public data centre and can be hosted by the M2M Service Provider, Network Service Provider or Application Service Provider. Four logical interfaces are defined between the server and client, namely bootstrapping 24 being pre-provisioned or client/server initiated; registration 26 to register the client 22 and its objects 50; object/resource access or device management 28 to enable server 16 access to an Object 50 or resource 48; and information reporting 30 for notifications with new resource 48 values.

The LWM2M protocol stack 32 uses the Constrained Application Protocol (CoAP) 34 as the underlying transfer protocol over User Datagram Protocol (UDP) and Short Message Server (SMS) bearers 36. The CoAP protocol 34 defines the message header, request/response codes, message options and retransmission mechanisms. The CoAP protocol 34 is an alternative to HTTP for Representational State Transfer (RESTful) Application Programming Interfaces (APIs) on resource-constrained devices 10 and supports the methods of GET, POST, PUT, DELETE, which can be mapped to those of HTTP. Unlike HTTP, CoAP messages are exchanged asynchronously between CoAP end-points over a datagram-oriented transport such as UDP. CoAP messages are encoded in a binary format allowing functionality to start with a 4-byte overhead. LWM2M defines the UDP Binding with CoAP as mandatory whereas the SMS Binding with CoAP is optional, which in effect means that LWM2M client 22 to server 16 interaction may occur both via SMS and UDP 36.

The LWM2M architecture 20 use security protocols to secure communications between client 22 and server 16 using a Datagram Transport Layer Security (DTLS) 38. DTLS 38 is used to provide a secure channel between the LWM2M server 16 and the LWM2M client 22 for all efficient payloads 40. The efficient payloads 40 can be plain text for individual resources and Binary TLV or JSON for resource batches (Object or Resource Arrays). DTLS 38 security modes include both pre-shared key and public key technology to support embedded devices 10.

M2M application 42 developers can manage the devices 10 remotely through a M2M web application 44 and a M2M device management application 46.

Referring to FIG. 3, the client 22 illustrated in FIG. 2 is shown in more detail. Each piece of information made available by the LWM2M client 22 is a Resource 48. A Resource 48 is a piece of information that can be read, written or executed and is accessed with URIs:

/{Object ID}/{Object Instance}/[Resource ID], for example /3/0/1 (Device Object, Manufacturer Resource).

The Resources 48 are further logically organized into Objects 50. Each LWM2M client 22 can have any number of Resources 48, each of which belongs to an Object 50. For example, a Firmware Object 52 may contain all the Resources 54 used for firmware update purposes.

Although not shown in FIG. 3, a set of objects for device management purposes include:

Security object to handle security aspects between management servers 16 and the client 22 on the device 10;

Server object to define data and functions related to the management server 16;

Access control object to define for each of several permitted management servers 16 the access rights the servers 16 have for each data object on the client 22;

Device object to detail resources on the M2M device 10 related to device 10 specific information;

Location object to group those resources that provide information about the current location of the M2M device 10;

Connectivity object to group together resources on the M2M device 10 that assist in monitoring the status of a network connection;

Connection statistics object to group together resources on the M2M device 10 that hold statistical information about an existing network connection.

As an example, the device object allows remote retrieval of device information such as manufacturer, model, power information, free memory and error information. Furthermore the device object provides a resource for initiation of a remote reboot or factory reset.

As discussed in more detail with reference to FIGS. 4(a) and 4(b), the LWM2M standard defines a provisioning and bootstrapping 24 functionality that allows the server 16 to manage the keying, access control and configuration of the device 10 to enroll with the server 16. The LWM2M Bootstrap server is used to provide information through the Bootstrap Interface 24 for client 22 so that the client 22 can perform its registration with one or more servers 16. After the bootstrap sequence, the client 22 has a server account and optionally some other object instances such as Access Control or Connectivity Object.

Bootstrapping for complete provisioning and key management may be pre-configured bootstrapping such as from Flash; smart card bootstrapping such as from a SIM card or use of a bootstrap server for initial setup or re-configuration and keying in the modes client-initiated bootstrapping and server-initiated bootstrapping.

Figure 4A:
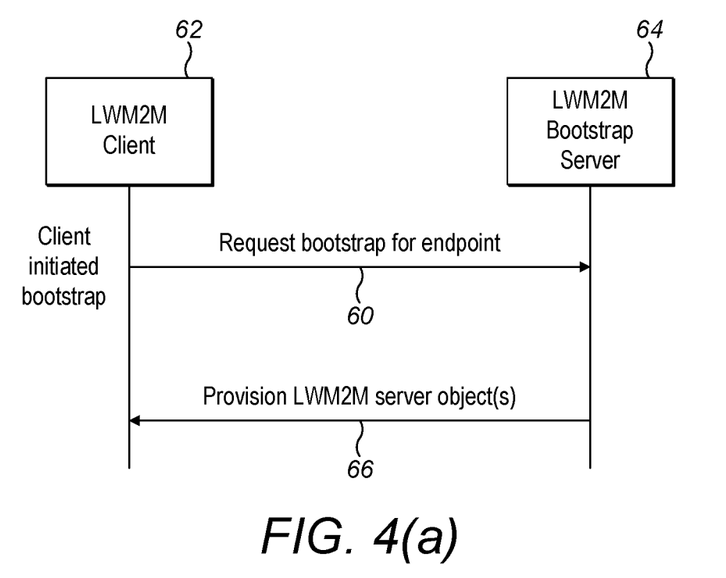
FIGS. 4(a) and 4(b) are schematic diagrams of a client initiated bootstrap (FIG. 4a) and a server initiated bootstrap (FIG. 4b), respectively.

In its most simplified form as shown in FIG. 4(a) a client initiated bootstrap comprises a request for bootstrap for an endpoint device step 60 from a LWM2M client 62. In response, a LWM2M bootstrap server 64 provides a provision of LWM2M server objects 66 to the LWM2M client 62. In every case, a bootstrap server 64 gives a device server's information according to OMA LWM2M—at a minimum, the IP address and security mode of the device server.

Figure 4B:
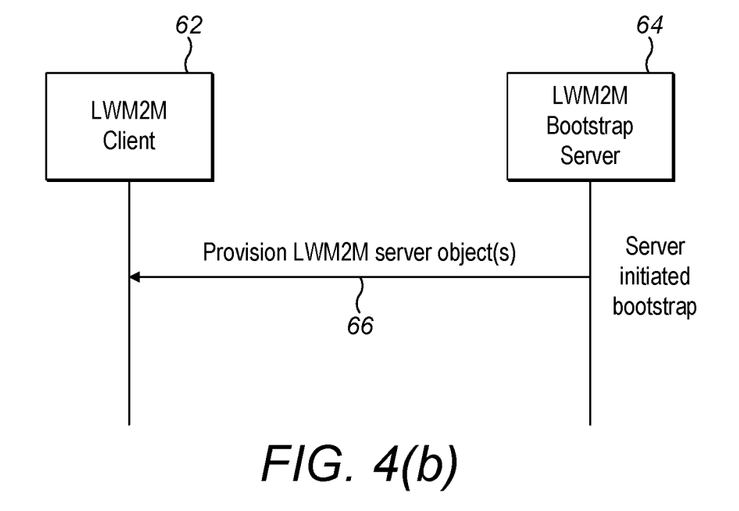

Referring to FIG. 4(b) a server initiated bootstrap comprises a provision of LWM2M server objects 66 only from LWM2M bootstrap server 64 to LWM2M client 62.

Figure 5A:
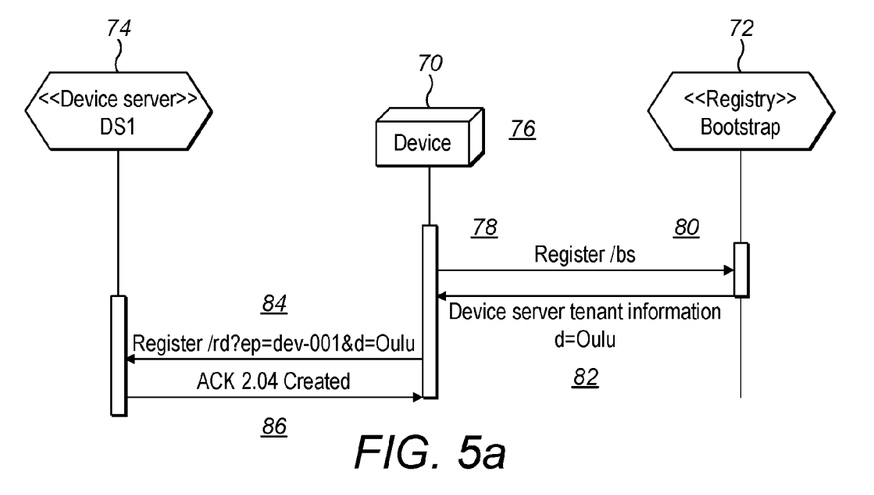
FIGS. 5a and 5b are schematic diagrams of methods of assigning tenancy according to a first embodiment.
Figure 5B:
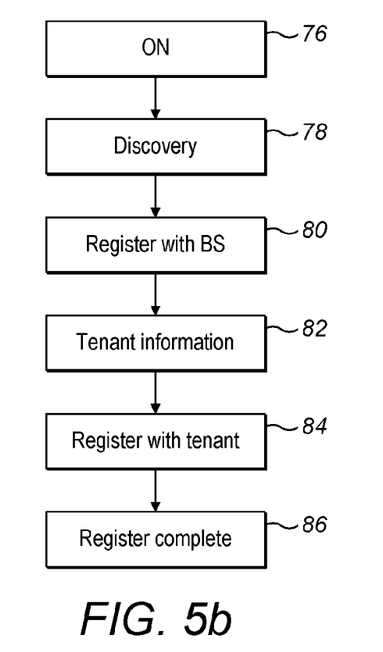

FIG. 5a is a schematic diagram of a bootstrap process including provisioning of tenancy name according to present techniques. The bootstrap process includes a device 70, a bootstrap server 72 and a device server 74. Bootstrap server 72 and device server 74 can be the same or different devices. For instance, bootstrap server 72 can be a first device, and device server 74 can be a second, different device. In other examples, bootstrap server 72 and device server 74 can be a same device, with functionality attributed herein to bootstrap server 72 and device server 74 implemented as separate applications executing on, e.g., one or more processors of the same device. Referring to FIG. 5b, the bootstrapping process includes at step 76 the initial powering on of the device 70. The device 70 may then connect with a bootstrap server in order to begin the bootstrap process. At step 78, there can be several mechanisms for discovering the bootstrap server 72 including assuming a default location such as on an edge router or by assigning an anycast address to the bootstrap server 72. Bootstrap servers 72 may be discoverable by other methods depending upon the deployment.

Following step 78 and discovery the device 70 may register at step 80 with the bootstrap server 72. Typically, the bootstrap server accepts a POST from the device 70 such as POST/bs?ep=temperature_sensor001. In the present technique, the domain to which the device 70 belongs is not included in the POST. The bootstrap server 72 maintains or has access to a list matching domains with devices, and so device 70 may be identified in the list. For example, the device 70 name can be sent from the device 70 to the bootstrap server 72 in the form of a string uniquely identifying the device during step 80. Examples of such identification includes the International Mobile Station Equipment Identity (IMEI) number.

In step 82, the bootstrap server 72 returns device server 74 tenant information in the form of which domain the device 70 is attributed to. The device 70 may then, in step 84, register with the domain by contacting the device server 74 using a POST in the form Register POST /rd?ep=temperature_sensor001&d=Oulu. The device server 74 accepts the request in step 86 and may respond with an Acknowledge 2.04 and may perform WRITE operations to PUT further information the device 70. Therefore as part of the bootstrapping process a device may register with the server using a request similar to POST/ rd?ep=temperature_sensor001&d=tenant_name where d is the domain or tenant name.

Figure 6A:
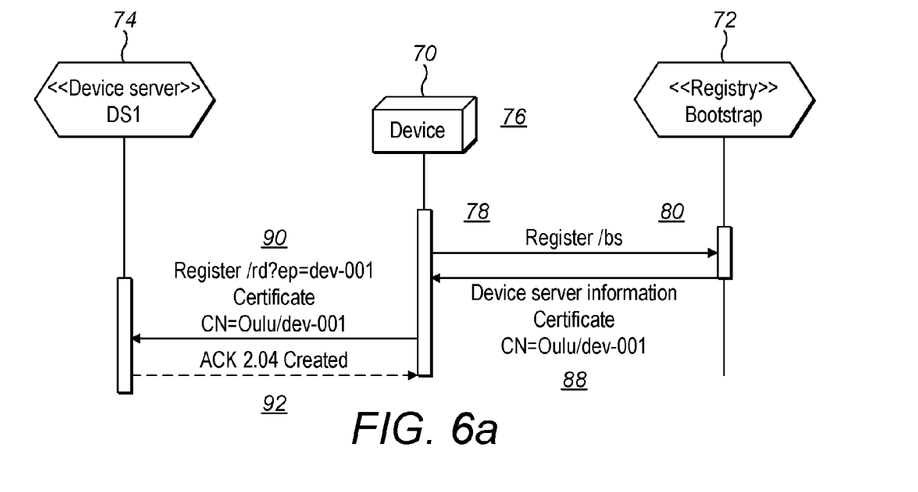
FIGS. 6a and 6b are schematic diagrams of methods of assigning tenancy according to a second embodiment.
Figure 6B:
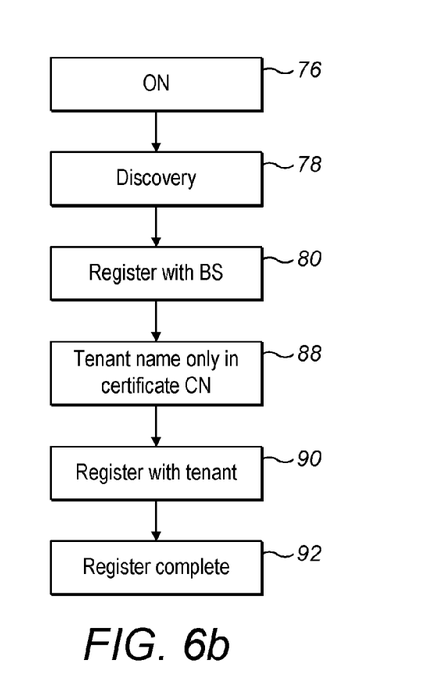

FIG. 6a is a schematic diagram of a bootstrap process including provisioning of tenancy name according to present techniques. Same reference numerals shall be used to identify like parts and process steps. The bootstrap process includes the device 70, bootstrap server 72 and device server 74. Referring to FIG. 6b, the bootstrapping process includes at step 76 the initial powering on of the device 70. The device 70 may then connect with a bootstrap server in order to begin the bootstrap process. At step 78, there can be several mechanisms for discovering the bootstrap server 72 including assuming a default location such as on an edge router or by assigning an anycast address to the bootstrap server 72. Bootstrap servers 72 may be discoverable by other methods depending upon the deployment.

Following step 78 and discovery the device 70 may register at step 80 with the bootstrap server 72. Typically, the bootstrap server accepts a POST from the device 70 such as POST/bs?ep=temperature_sensor001. In the present technique, the domain to which the device 70 belongs is not included in the POST. The bootstrap server 72 maintains a list of domains of which device 70 is included and device 70 may be identified against the list in a variety of ways. For example, the device 70 name can be sent in the form of a string uniquely identifying the device. Examples of such identification includes the International Mobile Station Equipment Identity (IMEI) number.

In step 88, the process differs to that described in connection with FIG. 5b in that in step 88 the bootstrap server 72 returns a device server information certificate with the tenant name in the certificate Common Name (CN) only. The certificate Common Name is typically the Host and Domain Name of the device server 74 and may be in the format of an URI such as www.arm.com/oulu/.

Therefore in step 90 the device 70 is not aware of the tenant name yet proceeds to register with the device server 74 because the bootstrap server 72 has provided a certificate containing tenant name in the CN field. The registration may be in the form of a POST request such as Register POST /rd?ep=temperature_sensor001 with a certificate CN=domain/temperature_sensor001. In step 92 the device server 74 takes the tenant name from the certificate CN field and accepts the request and may respond with an Acknowledge 2.04 and may perform WRITE operations to PUT further information the device 70.

Figure 7A:
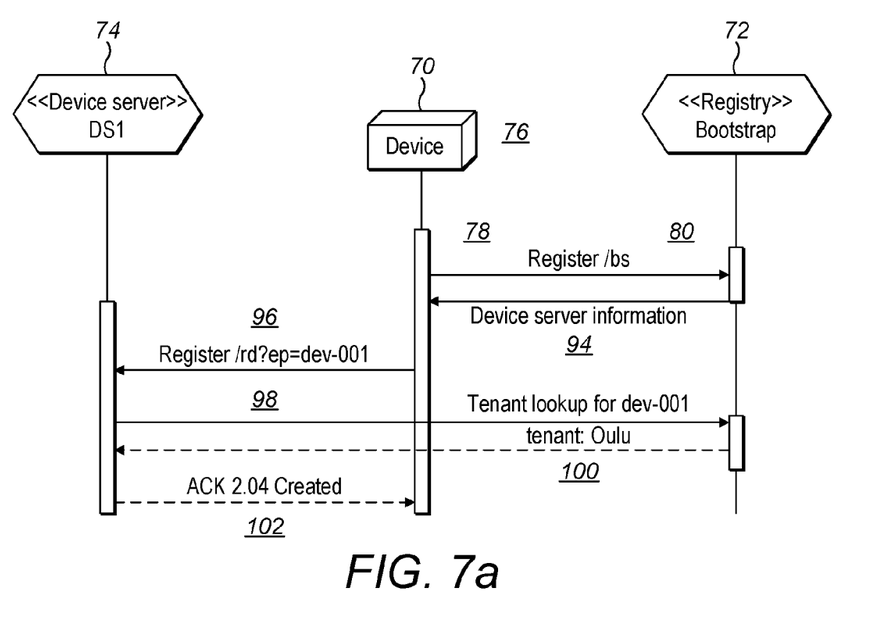
FIGS. 7a and 7b are schematic diagrams of methods of assigning tenancy according to a third embodiment.

FIG. 7a is a schematic diagram of a bootstrap process including provisioning of tenancy name according to present techniques. Same reference numerals shall be used to identify like parts and process steps.

Figure 7B:
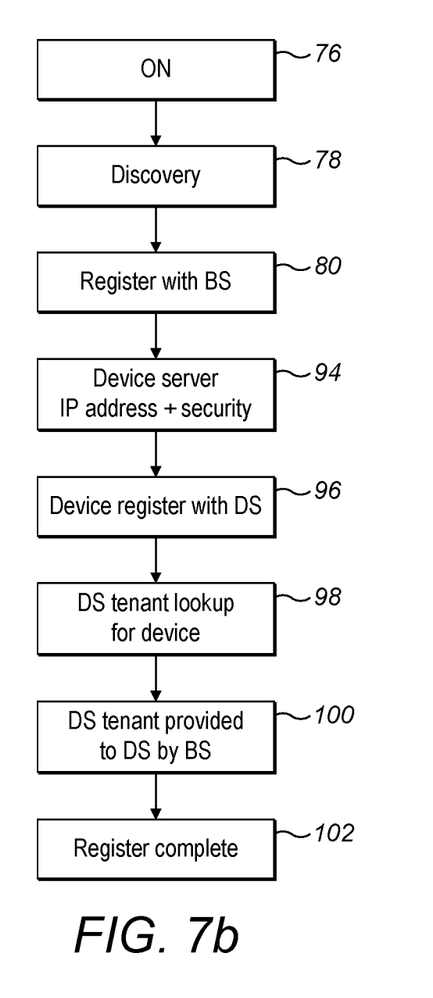

The bootstrap process includes the device 70, bootstrap server 72 and device server 74. Referring to FIG. 7b, the bootstrapping process includes at step 76 the initial powering on of the device 70. The device 70 may then connect with a bootstrap server in order to begin the bootstrap process. At step 78, there can be several mechanisms for discovering the bootstrap server 72 including assuming a default location such as on an edge router or by assigning an anycast address to the bootstrap server 72. Bootstrap servers 72 may be discoverable by other methods depending upon the deployment.

Following step 78 and discovery the device 70 may register at step 80 with the bootstrap server 72. Typically, the bootstrap server accepts a POST from the device 70 such as POST/bs?ep=temperature_sensor001. In the present technique, the domain to which the device 70 belongs is not included in the POST.

In step 94 the bootstrap server 72 returns device server 74 information to the device 70, but not the domain tenancy information. As a minimum according to the OMA LWM2M standard the bootstrap server 72 provides the device 70 with the IP address of device server 74 and its security mode. Therefore the device 70 may register with the device server 74 using a POST rd?ep=temperature_sensor001 message at step 96.

At step 98, the device server 74 may implement a tenant look-up for the device 70. In doing so, the device server 74 communicates with the bootstrap server 72 in order to ask which domain has been assigned to the device 70. The device server 74 may obtain the lookup address of the bootstrap server 72 from any message sent by the device 70 at the time that the device 70 registers with the device server in step 96, for example. Alternatively, the device server 74 may be aware of the address of the bootstrap server 72 or may employ a discovery protocol as is described above.

The device server 74 and the bootstrap server 72 communicate with one and another through a communications channel and in a network the channel may be split into a control channel and data channel. Typically, the control channel is used for the bootstrap protocol and the data channel is used during normal network operation with any node on the network being able to support multiple control or data channels. When the control and data channels are the same, the bootstrapping is done In Band (IB). When the control and data channels are different, the bootstrapping is performed Out of Band (OOB). In present techniques, the communications can be performed either In or Out of Band.

At step 100, the bootstrap server 72 returns the tenant name to the device server 74 which accepts the request and may respond with an Acknowledge 2.04 and may perform WRITE operations to PUT further information the device 70 in order that registration is complete at step 102.

Figure 8A:
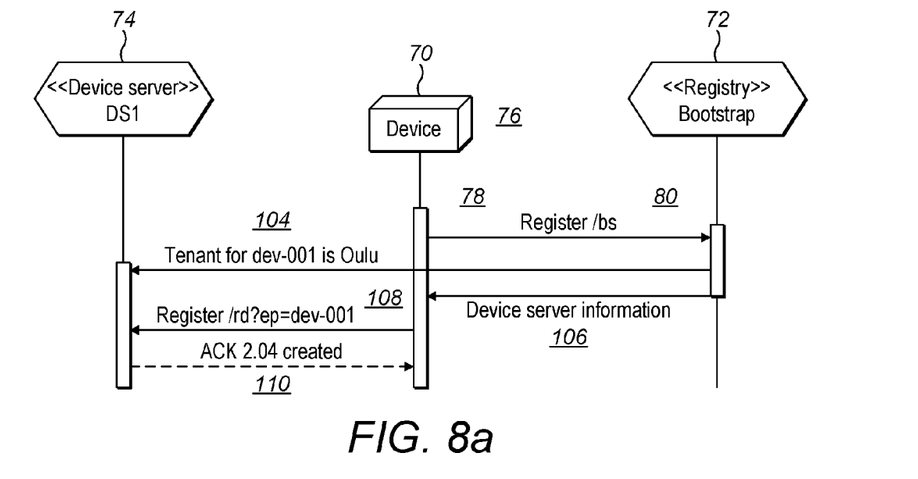
FIGS. 8a and 8b are schematic diagrams of methods of assigning tenancy according to a fourth embodiment.

FIG. 8a is a schematic diagram of a bootstrap process including provisioning of tenancy name according to present techniques. Same reference numerals shall be used to identify like parts and process steps.

Figure 8B:
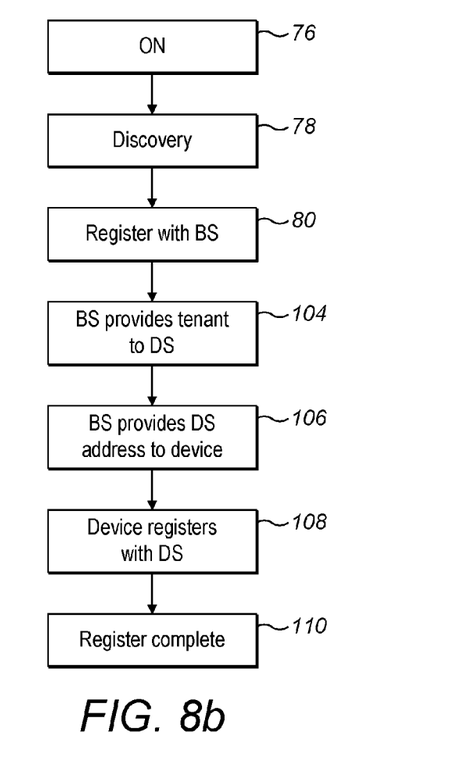

The bootstrap process includes the device 70, bootstrap server 72 and device server 74. Referring to FIG. 8b, the bootstrapping process includes at step 76 the initial powering on of the device 70. The device 70 may then connect with a bootstrap server 72 in order to begin the bootstrap process. At step 78, there can be several mechanisms for discovering the bootstrap server 72 including assuming a default location such as on an edge router or by assigning an anycast address to the bootstrap server 72. Bootstrap servers 72 may be discoverable by other methods depending upon the deployment.

Following step 78 and discovery the device 70 may register at step 80 with the bootstrap server 72. Typically, the bootstrap server accepts a POST from the device 70 such as POST/bs?ep=temperature_sensor001. In the present technique, the domain to which the device 70 belongs is not included in the POST. The bootstrap server 72 maintains a list of domains of which device 70 is included, and device 70 may be identified against the list in a variety of ways. For example, the device 70 name can be sent in the form of a string uniquely identifying the device. Examples of such identification includes the International Mobile Station Equipment Identity (IMEI) number.

In step 104, the process differs to that described above in that in step 104 the bootstrap server 72 communicates to the device server 74 the tenant name for the device 70. In step 106, the bootstrap server 72 provides the device server 74 information to the device 70. As a minimum according to the OMA LWM2M standard the bootstrap server 72 provides the device 70 with the device server's 74 IP address and its security mode. Therefore the device 70 may register with the device server 74 using a POST rd?ep=temperature_sensor001 message at step 108. Upon registration with the device server 74, the tenant name can be resolved and acknowledged by the device server 74 with reference to the device 70 name provided in step 104.

At step 110, the device server 74 may respond with an Acknowledge 2.04 and may perform WRITE operations to PUT further information the device 70 in order that registration is complete at step 110.

Figure 9A:
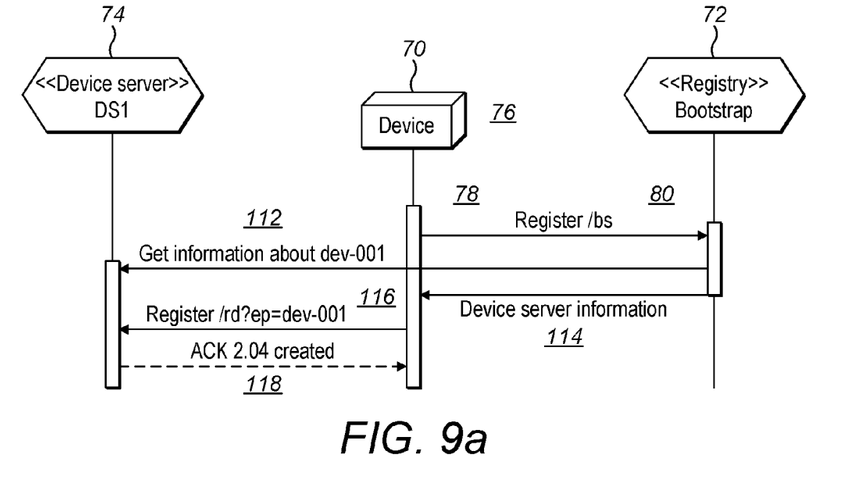
FIGS. 9a and 9b are schematic diagrams of methods of assigning tenancy according to a fifth embodiment.
Figure 9B:
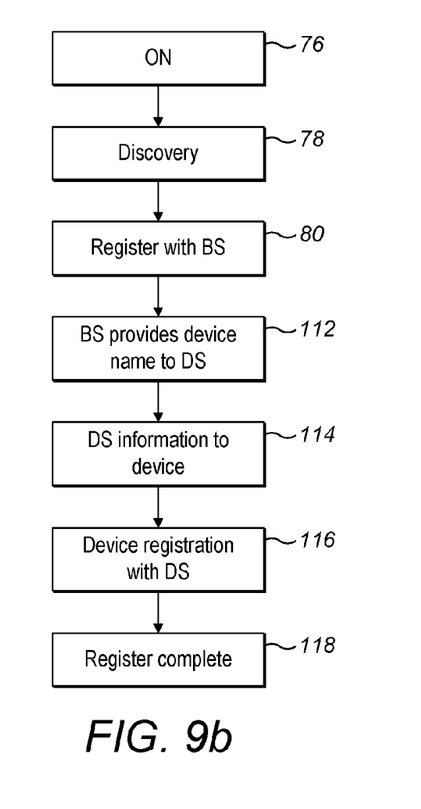

FIG. 9a is a schematic diagram of a bootstrap process including provisioning of tenancy name according to present techniques. Same reference numerals shall be used to identify like parts and process steps. The bootstrap process includes the device 70, bootstrap server 72 and device server 74. Referring to FIG. 9b, the bootstrapping process includes at step 76 the initial powering on of the device 70. The device 70 may then connect with a bootstrap server in order to begin the bootstrap process. At step 78, there can be several mechanisms for discovering the bootstrap server 72 including assuming a default location such as on an edge router or by assigning an anycast address to the bootstrap server 72. Bootstrap servers 72 may be discoverable by other methods depending upon the deployment.

Following step 78 and discovery the device 70 may register at step 80 with the bootstrap server 72. Typically, the bootstrap server accepts a POST from the device 70 such as POST/bs?ep=temperature_sensor001. In the present technique, the domain to which the device 70 belongs is not included in the POST.

In the present technique as described in FIGS. 9a and 9b, the bootstrap server 72 does not hold any information about the device 70 and is forced to communicate in step 112 with the device server 74 in order that the device server 74 can GET the relevant information using the name provided by the device 70.

Therefore in step 112, the bootstrap server 72 provides the device 70 name to the device server 74 in order that the device server 74 obtains tenant name, certificate and configuration information relevant to device 70. The present technique enables the device server 74 certificate and information to be controlled by the device server 74 itself and not by a third party like the bootstrap server 72.

In step 114, the bootstrap server 72 provides device server information to the device 70. As a minimum according to the OMA LWM2M standard the bootstrap server 72 provides the device 70 with the device proceeds to register with the device server 74. The registration may be in the form of a POST request such as Register POST/rd?ep=temperature_sensor001 and the device server 74 may respond in step 118 with an Acknowledge 2.04 and may perform WRITE operations to PUT further information the device 70.

Those skilled in the art will appreciate that while the foregoing has described what is considered to be the best mode and where appropriate other modes of performing present techniques, these techniques should not be limited to the specific configurations and methods disclosed in this description of the preferred embodiment. Those skilled in the art will recognise that the techniques have a broad range of applications, and that the embodiments may take a wide range of modifications without departing from the inventive concept as defined in the appended claims.

In one aspect, present techniques provide a method of assigning tenancy to a device during bootstrapping between a device and a server in a network, the method comprising: transmitting a device identifier to a bootstrap server; receiving, at the device, a device server address to enable the device to register with a device server, and wherein the tenancy is assigned to the device with the device server address. Such a technique enables tenancy to be assigned to a device by a bootstrap server so that a device can be initially operated without being programmed with the tenancy.

The method may include assigning tenancy within a certificate common name with the device server address. Assigning tenancy in this way may comprise the certificate common name being the host and domain name of the device server.

The device may identify itself using a device name selected from an IMEI, serial number or a logical name of the device.

In another aspect, present techniques provide for a method of assigning tenancy to a device during bootstrapping between a device and a server in a network, the method comprising: receiving a device identifier at a bootstrap server; transmitting, to the device, a device server address to enable the device to register with a device server, and assigning tenancy to the device with the device server address.

The bootstrap server may access data matching domains with devices and thereby assign tenancy based upon reference to the data. The method may include communicating the data to the bootstrap server in a data packet prior to bootstrapping. The communicating may occur in an out of band communication.

In another aspect, present techniques provide for a method of assigning tenancy to a device during bootstrapping between a device and a server in a network, the method comprising: transmitting a device identifier to a bootstrap server; receiving, at the device, a device server address to enable the device to register with a device server, and wherein upon registration of the device with the device server, the device server communicates with the bootstrap server to request assignment of tenancy for the device; and thereby assigning tenancy to the device.

In another aspect, present techniques provide for a method of assigning tenancy to a device during bootstrapping between a device and a server in a network, the method comprising: receiving a device identifier at a bootstrap server; transmitting, to the device, a device server address to enable the device to register with a device server; receiving, at the bootstrap server, a request of tenancy for the device from the device server and thereby assigning tenancy to the device.

In another aspect, present techniques provide for a method of assigning tenancy to a device during bootstrapping between a device and a server in a network, the method comprising: transmitting a device identifier to a bootstrap server; receiving, at the device, a device server address to enable the device to register with a device server, and wherein the device server is provided with assignment of the tenancy for the device before registration of the device with the device server.

In another aspect, present techniques provide for a method of assigning tenancy to a device during bootstrapping between a device and a server in a network, the method comprising receiving a device identifier at a bootstrap server; transmitting, to a device server, an assignment of tenancy for the device; transmitting, to the device, a device server address to enable the device to register with the device server, and wherein the device server is provided with the assignment of tenancy for the device before registration of the device with the device server.

In another aspect, present techniques provide for a method of assigning tenancy to a device during bootstrapping between a device and a server in a network, the method comprising: receiving a device identifier at a bootstrap server; providing, from the bootstrap server, the device identifier to a device server; and providing, from the bootstrap server to the device, information to enable the device to register with the device server, wherein the device server is provided with an assignment of tenancy for the device prior to registration of the device with the device server.

In another aspect, present techniques provide for a method of assigning tenancy to a device during bootstrapping between a device and a server in a network, the method comprising: receiving, from a bootstrap server, a device identifier; receiving, from a device, a request to register the device with a device server; and assigning tenancy based upon the device identifier. The device server may access data matching domains with devices and thereby assigns tenancy based upon reference to the data.

The invention claimed is:

1. A method of assigning tenancy to a device during lightweight Machine-to-Machine (LWM2M) bootstrapping between the device and a bootstrap server in a network, the method comprising:
  transmitting a device identifier from the device to the bootstrap server at a bootstrap server address stored in the device to register the device with the bootstrap server;
  receiving, from the bootstrap server at the device, a device server address to enable the device to register with a device server;
  transmitting, from the device to the device server at the device server address, the device identifier and the bootstrap server address to request registration of the device with the device server;

transmitting, from the device server to the bootstrap server at the bootstrap server address, a request for tenancy assigned to the device, the request including the device identifier;

assigning, by the bootstrap server, tenancy for the device using a tenant look-up based on the device identifier;

transmitting the assigned tenancy for the device from the bootstrap server to the device server; and transmitting, from the device server to the device, an acknowledgment to complete registration of the device with the device server.

2. The method of claim 1, including assigning tenancy within a certificate common name with the device server address.

3. The method of claim 2, wherein the certificate common name is a host and domain name of the device server.

4. The method of claim 1, wherein the device identifier comprises a device name selected from an International Mobile Station Equipment Identity (IMEI) number, serial number or a logical name of the device.

5. The method of claim 1, wherein the bootstrap server accesses data matching domains with devices and assigns tenancy based upon reference to the data.

6. The method of claim 5, including communicating the data to the bootstrap server in a data packet prior to bootstrapping.

7. The method of claim 6, wherein the communicating is an out of band communication.

* * * * *